UNITED STATES PATENT OFFICE.

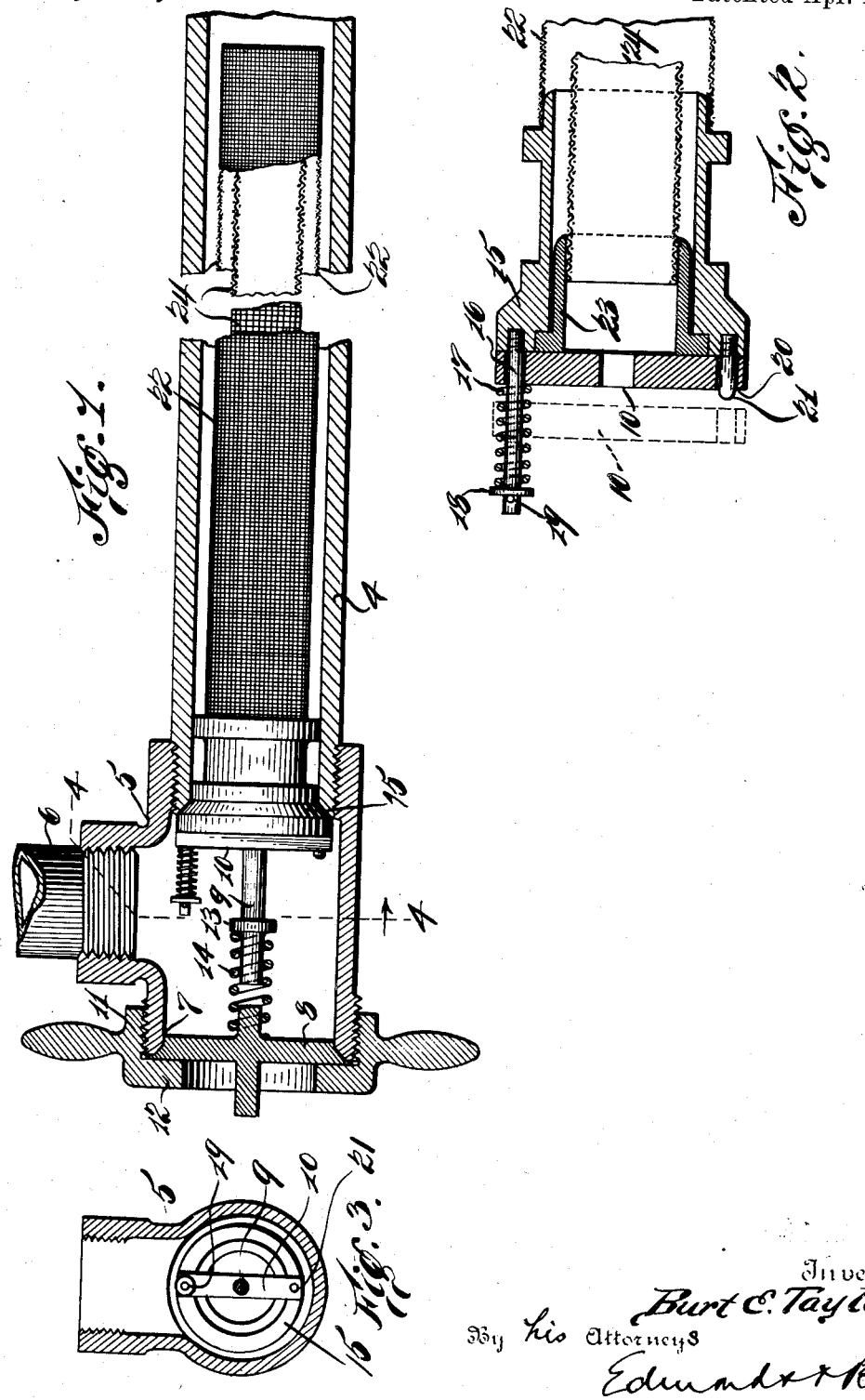

BURT E. TAYLOR, OF MOUNT VERNON, NEW YORK, ASSIGNOR TO BORDEN'S CONDENSED MILK COMPANY, OF NEW YORK, N. Y., A CORPORATION OF NEW JERSEY.

PIPE-STRAINER.

1,223,299.     Specification of Letters Patent.     Patented Apr. 17, 1917.

Application filed June 29, 1916. Serial No. 106,543.

*To all whom it may concern:*

Be it known that I, BURT E. TAYLOR, a citizen of the United States, and a resident of Mount Vernon, in the county of Westchester, State of New York, have invented certain new and useful Improvements in Pipe-Strainers, of which the following is a specification, reference being made to the accompanying drawings, forming a part thereof.

My invention relates to straining devices to be placed in pipes or conduits, and the object of my invention is to provide an improved form of strainer arranged within the ordinary pipe or conduit, which straining device shall be readily removable from the pipes, and of a simple and efficient construction with parts the inner faces of which shall have plane or smooth surfaces. This particular construction enables the same to be readily cleaned, which is particularly desirable and advantageous when my strainer is used in pipes or conduits through which milk or other liquid is passing; such devices and pipes necessarily requiring frequent cleansing in order to preserve the various parts in maximum efficiency and proper sanitation.

Another object of my invention is to form a strainer which not only shall be efficient in removing foreign particles from the liquid, but also shall preserve its shape and contour under ordinary conditions and usage, and shall also be yieldingly held in the pipe or conduit in which it shall be placed for use.

Other and further objects and advantages of my invention will be hereinafter fully set forth, and their novel features particularly pointed out in the appended claims.

In the drawings, Figure 1 is a longitudinal sectional elevation of a pipe or conduit having the pipe strainer located therein, the latter being partially broken away to show the interior structure;

Fig. 2 is a longitudinal sectional view of a detail of the apparatus shown in Fig. 1, showing means for detaching the inner strainer from the device;
Fig. 3 is a vertical sectional view taken on the line 4—4 of Fig. 1.

Similar numerals of reference refer to similar parts in the several figures of the drawings.
In the drawings, 4 indicates a conduit or pipe through which the liquid or milk is forced toward the right under pressure. One end of the pipe is screw-threaded, upon which the T-fitting 5 is secured, as shown in Fig. 1. At right angles to the pipe 4 is the inlet pipe 6 screw-threaded in the T-fitting 5, as shown. The fitting 5 has an opening 7 oppositely disposed to the orifice of the pipe 4. The opening 7 is preferably beveled interiorly, as shown in Fig. 1, and in this opening is placed the cap 8 having a centrally disposed projection extending inwardly toward the centrally disposed rod 9, mounted on the T-bar 10, such projection and rod having a common axis within the fitting 5, as shown in Fig. 1. The annular ring 11, screw-threaded interiorly and having the projecting flange 12, is fitted over the cap 8, and is screwed and firmly held on the outer end of the opening 7 to hold the cap 8 in position, as shown in Fig. 1. The rod 9 has the flange 13 preferably integral therewith, and between the flange 13 and the base of the cap 8 is the coil-spring 14 held under tension when the annular ring 11 is screwed down on the opening, as shown. The T-bar 10 (shown in cross section in Fig. 2) is pivoted to the annular strainer-disk 15 by the pin 16 secured in the disk 15, as shown, the T-bar 10 swinging on the pin 16, as shown. The coil-spring 17 is secured between the T-bar 10 and the flange 18 removably secured to the outer end of the pin 12 by the catch 19, the coil-spring 17 tending to hold the T-bar 10 in the position shown in full lines in Fig. 2. The opposite end of the T-bar 10 has cut therein the hole 20 adapted to be engaged by the dowel-pin 21, which holds the bar 10 in its transverse position across the opening of the annular-disk 15. By forcing outwardly the T-bar, as shown in dotted lines, its outer end will be disengaged from the dowel-pin 21, and then may be swung upwardly, as shown in detail, in dotted lines, in Fig. 2.

The inner end of the pipe 4 within the fitting 5 is beveled so as to afford a seat to be engaged by the outer conical surfaces of the annular, apertured, disk, or collar, 15 which is adapted to bear against the beveled surfaces of the pipe 4, as shown in Fig. 1. This annular disk 15 carries, at its inner end, a fine tubular wire mesh screen strainer 22, closed at its outer end, and extending in parallelism with the longitudinal axis of the pipe 4, as shown in Fig. 1. Within the annular disk 15 is another smaller therewith concentric annular disk, or collar, 23 having mounted thereon a tubular wire mesh screen 24 similar in contour to the strainer 22, but of heavier wire and larger mesh, and of less diameter, adapted to be concentrically held within, or telescoped with, the outer screen 22, as shown in Fig. 1. When the screens 22 and 24 are held in position, as shown in Fig. 2, through their supporting disks 15 and 23 respectively, being held in position by the T-bar 10, the combined straining apparatus is yieldingly held within the pipe 4 by the T-bar 10 pressing against the disks 15 and 23 through the action of the coil-spring 14 coiled about the rod 9, as shown in Fig. 1. When it is desired to remove the two strainers from the pipe for cleansing, the ring 11 is loosened and removed from the fitting 5, the cap 8 with its projections is freed from the spring 14, and the rod 9 is then detached along with the T-bar 10. The combined strainers can thereupon be removed from the pipe 4, and thereafter the T-bar 10 is moved to the left in Figs. 1 and 2, to the position shown in dotted lines in Fig. 2, which enables it to clear the dowel-pin 21, after which it is swung free to the upper position in dotted lines as shown in Fig. 2. This enables the interior screen 24 with its supporting disk 23 to be removed from within the outer screen 22 and cleansed, and thereafter both parts may be separately cleansed of any foreign matter collected by the respective screens.

In operation, the liquid passes, under pressure, through the pipe 6 into the fitting 5, and thence through the interior strainer 24 which catches in its meshes the larger particles of foreign substances in the liquid, and the exterior concentric screen 22 thereupon catches the smaller particles which have passed through the interior screen, and the liquid is finally strained, and thence passed forwardly through the pipe 4 out of my improved apparatus. Other concentric strainers may be similarly telescoped within or without the two strainers I have shown and described, if found necessary or desirable.

It will be seen that the inner screen of heavier mesh also acts as a support to the exterior finer mesh, assisting same to retain its shape and operative disposition under any pressures or partial vacuum caused by the intermittent flow of liquid through my device.

It is obvious that my improved pipe strainer has great simplicity of construction, combined with durability and efficiency, and it may be readily taken apart for cleaning when required, and, further, that it is yieldingly held within the pipe with a construction which not only removes all foreign substances from the liquid in its normal passage through the conduits, but also serves, with its concentric strainers of wire mesh of different sizes, to preserve the different mesh screens in proper rigidity and position. It is also apparent that the various parts may be readily detached from the pipes and conduits and from each other, whereby the entire apparatus, as shown and herein described, may be readily cleaned.

I claim as my invention:

1. A pipe-strainer comprising in combination with a pipe provided with inlet and outlet ports, a plurality of tubular wire mesh straining devices concentrically disposed within one another in substantial parallelism with the longitudinal axis of the pipe, and respectively mounted each on one of a like plurality of separable annular apertured disks concentrically and successively held within one another, the outer disk being seated upon the inlet port of the pipe, and means for removably holding said outer disk in position on said inlet port.

2. A pipe-strainer comprising in combination with a pipe provided with inlet and outlet ports, a plurality of tubular wire mesh straining devices concentrically disposed within one another in substantial parallelism with the longitudinal axis of the pipe, and respectively mounted each on one of a like plurality of separable annular apertured disks concentrically and successively held within one another, the outer disk being seated upon the inlet port of the pipe, and yielding means for removably holding said outer disk in position on said inlet port.

3. A pipe-strainer comprising in combination with a pipe provided with inlet and outlet ports, a plurality of tubular wire mesh straining devices concentrically disposed within one another in substantial parallelism with the longitudinal axis of the pipe, and respectively mounted each on one of a like plurality of separable annular apertured disks concentrically and successively held within one another, the outer disk being seated upon the inlet port of the pipe, the wire mesh perforations of each being successively smaller from the inner to the outer of said straining devices, and means for removably holding said outer disk in position on said inlet port.

4. A pipe-strainer comprising in combination with a pipe provided with inlet and outlet ports, a plurality of tubular wire mesh straining devices concentrically disposed within one another in substantial parallelism with the longitudinal axis of the pipe, and respectively mounted each on one of a like plurality of separable annular apertured disks concentrically and successively held within one another, the outer disk being seated upon the inlet port of the pipe, the wire mesh perforations of each being successively smaller from the inner to the outer of said straining devices, and yielding means for removably holding said outer disk in position on said inlet port.

5. A pipe-strainer comprising in combination with a pipe provided with inlet and outlet ports, a plurality of tubular wire mesh straining devices concentrically disposed within one another in substantial parallelism with the longitudinal axis of the pipe, and respectively mounted each on one of a like plurality of separable annular apertured disks concentrically and successively held within one another, the outer disk being seated upon the inlet port of the pipe, and means, comprising a pivoted, spring-pressed, locking bar transversely disposed across said outer disk, for removably holding said outer disk in position on said inlet port.

6. A pipe-strainer comprising in combination with a pipe provided with inlet and outlet ports, a plurality of tubular wire mesh straining devices concentrically disposed within one another in substantial parallelism with the longitudinal axis of the pipe, and respectively mounted each on one of a like plurality of separable annular apertured disks concentrically and successively held within one another, the outer disk being seated upon the inlet port of the pipe, the wire mesh perforations of each being successively smaller from the inner to the outer of said straining devices, and means, comprising a pivoted, spring-pressed, locking bar transversely disposed across said outer disk, for removably holding said outer disk in position on said inlet port.

BURT E. TAYLOR.

Witnesses:
TIMOTHY J. MAHONEY,
THEODORE D. WAIBEL.